OR  3,729,249

United Stat
Habegger et al.

[11] 3,729,249
[45] Apr. 24, 1973

[54] METHOD AND APPARATUS FOR LARGE OBJECT INTERFERENCE PATTERN RECORDING

[75] Inventors: Millard A. Habegger, Poughkeepsie; Glenn T. Sincerbox, Wappingers Falls, both of N.Y.

[73] Assignee: International Business Machines Corporation, Armonk, N.Y.

[22] Filed: July 12, 1968

[21] Appl. No.: 744,404

[52] U.S. Cl. .................................. 350/3.5, 356/112
[51] Int. Cl. .................................... G02b 27/00
[58] Field of Search ..................... 350/3.5, 150; 356/106, 112

[56] References Cited

UNITED STATES PATENTS 3,282,148  11/1966  Yamada ..................... 356/112
3,383,460  5/1968  Pritchard .................... 350/150

OTHER PUBLICATIONS

Hoffman, et al., J. Opt. Soc. Am., Vol. 55, No. 11, p. 1559 (11/1965).
Brooks et al., IEEE Journal of Quantum Electronics, Vol. 2, No. 8, pp. 275–279 (8/1966).
Bell Laboratories Record, Vol. 45 No. 7 pp. 238–239 (7–8/67).
Denisyuk, Optics & Spectroscopy, Vol. 15, No. 4, pp. 279–284 (10/1963).
Zaidel et al., Soviet Physics–Technical Physics, Vol. 11, No. 12, pp. 1650–1652, (6/1967).

Primary Examiner—David Schonberg
Assistant Examiner—Ronald J. Stern
Attorney—Hanifin and Jancin and John F. Osterndorf

[57] ABSTRACT

Interference pattern recording of large objects or scenes having dimensions exceeding the coherence lengths of available light sources is accomplished. The recording is performed by illuminating the storage medium with a plurality of reference beams all of which are collinear and the scattered radiation from the object. A path length difference not exceeding and preferably slightly less than the coherence length of the radiation sources is introduced into each successive reference beam.

14 Claims, 4 Drawing Figures

Patented April 24, 1973 3,729,249

INVENTORS
MILLARD A. HABEGGER
GLENN T. SINCERBOX

BY John F. Ostendorf
ATTORNEY

METHOD AND APPARATUS FOR LARGE OBJECT INTERFERENCE PATTERN RECORDING

BACKGROUND OF THE INVENTION

1. Field of the Invention

This invention relates to the recording of large scenes in interference patterns and, more particularly, to the method and apparatus for recording and reading out of information which may be in the form of objects having dimensions substantially greater than the coherence length of the radiation source.

2. Description of the Prior Art

In the interference pattern recording of an object or a scene, it is conventional practice to make the optical path length of the reference beam as equal as possible to the optical path length of the radiation beam scattered from the object. Due to the limitations of the coherence lengths of available coherent radiation sources, this equality of optical distances is relaxed so that an optical path difference between the reference beam path and the path of the scattered radiation from the object is permitted. However, this path difference cannot exceed the coherence length of the radiation source.

These requirements are necessary in order to provide good contrast among the interference fringes recorded in the storage medium. With presently available radiation sources having coherence lengths in the order of inches it is impossible to make an interference pattern recording of an object or scene that has any of its dimensions larger than a few inches.

SUMMARY

As contrasted with the prior art methods of recording and reading out information stored in interference patterns according to the holographic and Lippmann holographic methods, this invention provides for the recording of objects having dimensions exceeding the coherence length of the presently available radiation sources. The storage medium is illuminated with a plurality of reference beams. All of these reference beams are collinear with respect to one another. An optical path length difference not exceeding and preferably slightly less than the coherence length of the radiation source is introduced into each successive reference beam. The pattern of interference fringes is recorded in the storage medium as a result of the interaction of the appropriate reference beam and the scattered radiation from the object. The scattered radiation has an optical path difference less than the coherence length of the light source.

According to one aspect of the invention the different optical path lengths in the reference beam are introduced by separating the original reference beam provided from the source into a plurality of components. Each of the components is optically delayed with respect to the others and is thereafter redirected to a common axis for all the reference beams. In this method of recording both the scattered radiation from the object and the reference beams interfere in the storage medium from the same side of the medium.

Another aspect of the invention provides for the recording to take place according to the Lippmann holographic technique. In this technique, the reference beams interfere with the scattered radiation from the object from opposite sides of the storage medium.

DESCRIPTION OF THE PREFERRED EMBODIMENT

Figure 1:
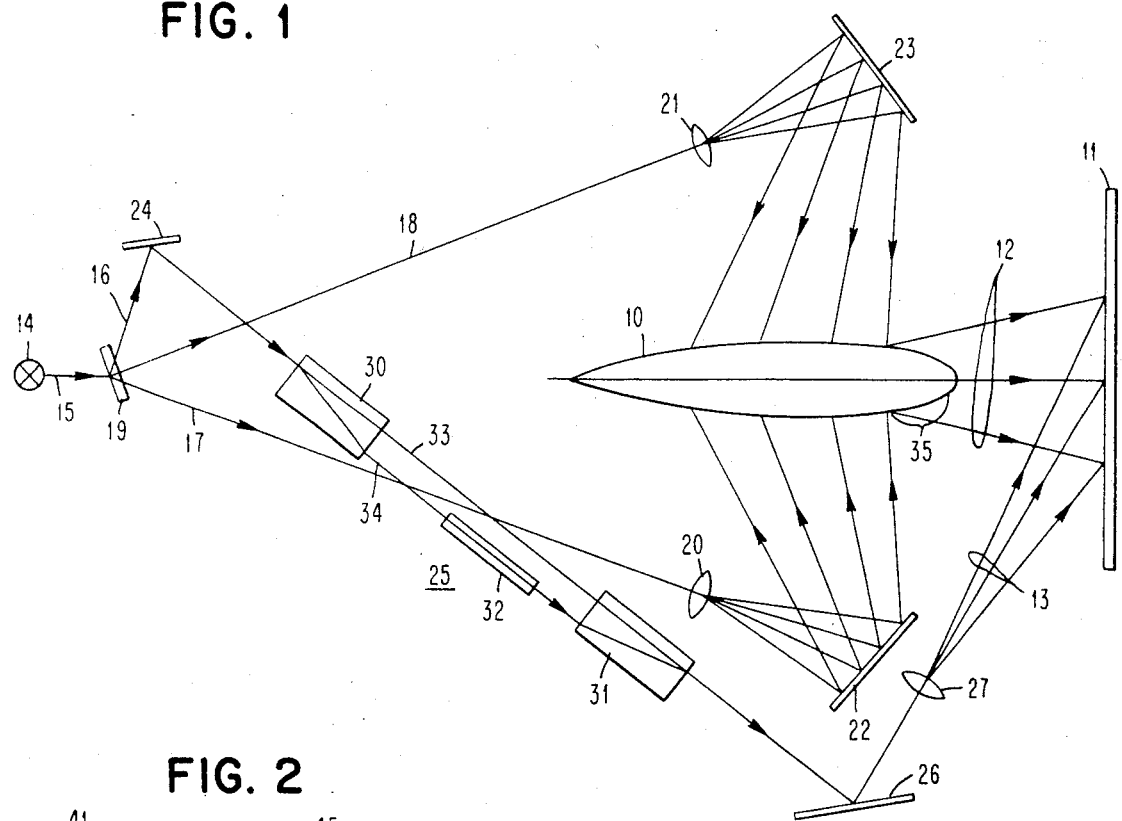
FIG. 1 is a schematic diagram illustrating one arrangement for accomplishing the storage of information according to the method of the invention.

In FIG. 1 a large object or scene such as a model of a ship 10 is recorded as an interference pattern in a storage medium such as a photographic emulsion 11. The recording takes place by the interference of scattered radiation 12 from the object 10 and a reference beam of radiation 13. In this instance beams 12 and 13 interfere on the same side of photographic emulsion 11 to form a conventional hologram in the emulsion. Accordingly, for purposes of this description the invention will be described in terms of holography.

Both the scattered radiation from the object 10 and the reference beam of radiation are provided initially from a source 14 of coherent radiation. Source 14 may be a light radiation source in the form of a laser. For purposes of this description, source 14 is considered to be such a light radiation source. One such laser that may be utilized is a helium neon laser producing a coherent light beam having a wave length of 6328 A. Such a laser has a coherence length approximating 6 inches when operated at full power. This coherence length may be increased by reducing the length of the laser cavity at the expense of reduced laser output power. However, for purposes of this invention it is desired that the laser operate at substantially its maximum level of power.

Light source 14 provides a beam 15 which is broken into three components 16, 17 and 18 by beam splitting apparatus schematically indicated at 19. Components 17 and 18 are directed along paths through lenses 20 and 21, respectively. The lenses act to diverge the beams providing for the illumination of the entire object 10 after being reflected from the mirrors 22, 23. The length of object 10 in this embodiment of the invention is greater than the coherence length of light source 14. The light scattered from object 10 is modulated with information relative to the contour and dimensions of the object and is directed at photographic emulsion 11 as beam 12. The photographic emulsion employed in the method and apparatus of this invention are conventional in nature. One such emulsion which may be utilized is that available as Eastman Kodak Type 649–F Plates. Such an emulsion provides high resolution in recording the interference patterns.

Component 16 provided from beam splitting apparatus 19 is reflected by mirror 24 through optical apparatus generally indicated at 25 and a second mirror 26 to lens 27. Lens 27 acts to provide the flood like beam 13 for interference with scattered light beam 12.

Apparatus 25 provides for the generation of two reference beams. It includes birefringent deflection elements 30, 31 and optical delay element 32. Element 30 which may be a calcite crystal accepts component 16 from mirror 24 and splits it into two other components 33, 34. If component 16 has a circular polarization, component 33 has a polarization direction that is perpendicular to the plane of the drawing and component 34 has a polarization direction that is parallel to the plane of the drawing. Component 33 is passed directly to element 31, which may also be a calcite crystal, and through this crystal without deflection to mirror 26 to act as a first reference beam.

Component 34 is deflected in element 30 and directed to optical delay element 32. This delay element may be a glass rod having an index of refraction $n$ and a length $d$. To assure that component 34, which acts as a second reference beam, is provided with the proper delay, that is, a path length difference is imparted between components 33, 34 which does not exceed the coherence length of the light from source 14, the following relationship must be satisfied.

$(n-1)d = L$ where $L$ is the coherence length of light source 14.

Fused quartz is one material which may be utilized as the glass rod. It has an index of refraction approximating 1.46.

Component 34 after delay by glass rod 32 is directed to element 31 and deflected to the common reference beam axis. However, it is delayed in time with respect to component 33 such that a path length difference exists between components 33 and 34 that does not exceed the coherence length of the light from source 14. Thus, after reflection at mirror 26, beam 13 is provided to emulsion 11 as two reference beams with one delayed with respect to the other.

Each of the reference beams interferes with a different portion of the light scattered from object 10 as beam 12. Thus, the non-acted on reference beam, that is component 33, is adjusted so that it interferes with the light scattered from one end 35 of object 10, that is to the location of the shortest path for the scattered light beam 12. Each succeeding reference beam such as component 34 interferes with the scattered light from another portion of object 10 separated from the location 35 by slightly less than the coherence length of the light source. Alternately, the non-acted on light beam could be adjusted to interfere with the light from the median point of the object and each successive reference beam would act on the light scattered from another portion of the object 10.

As described in FIG. 1, two such reference beams are provided in time sequence for interference with the scattered light from the object to be recorded. Additional reference beams may also be provided, each having an optical delay different from the others and arranged such that they are related with respect to the coherence length of the light source.

Figure 2:
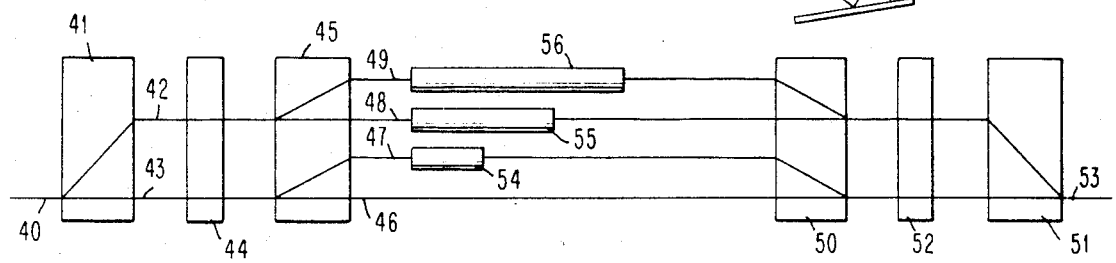
FIGS. 2, 3 and 4 are schematic diagrams showing apparatus for obtaining the plurality of reference beams utilized in the method of this invention.

Thus, in FIG. 2 four such reference beams are provided. To obtain four reference beams two deflecting stages are required. Light beam 40 is directed to birefringent element 41 which splits the beam into horizontally and vertically polarized components 42, 43 as described for components 33, 34 in FIG. 1. Components 42, 43 are directed to a passive polarization rotator such as quarter wave plate 44 which imparts a 45° lag to each of these components. The components are directed to a second birefringent element 45 which passes one portion directly through without deflection while a second portion is deflected to provide an additional beam. Thus four such components 46, 47, 48, 49 are provided from a two stage deflector. With the addition of another deflector stage eight such components are provided.

Components 46 – 49 are directed to a combining deflector comprised of birefringent elements 50, 51 and passive rotator 52. This deflector acts in the reverse manner from the entrance deflector formed of birefringent elements 41, 45 and rotator 44. Thus component 46 is passed directly through the combining deflector and appears on axis 53 as the first reference beam. Component 47 is passed through an optical delay element 54 of the type described with reference to the apparatus of FIG. 1. Delay element 54 imparts an optical delay which does not exceed and is preferably slightly less than the coherence length of the light source. Components 48 and 49 similarly pass through optical delay elements 55, 56 which impart, respectively, optical delays of twice and three times the coherence lengths of the light source. The combining deflector returns the components 47 – 49 to common reference beam axis 53 delayed with respect to one another to serve as the reference beams. Each of the reference beams provided by this apparatus is collinear with respect to the others but is in a timed relationship with respect to them. Thus, a sequence of reference beams is provided.

Although a combining deflector is indicated as being utilized to return the components to a common axis, this may also be accomplished by employing a reflective surface at the end of the delay elements to reflect the components back through the optical delay elements and the entrance deflector to a beam splitter located at the entrance location of beam 40. The beam splitter would remove the reference beams for utilization in recording the object.

Figure 3:
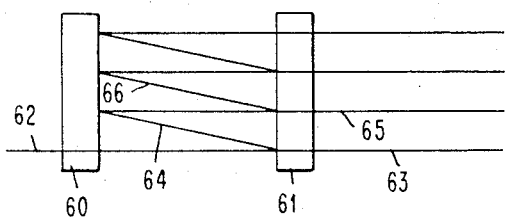

In FIG. 3, there is shown a Fabry-Perot cavity formed of partially silvered mirrors 60, 61. The distance between mirrors 60 and 61 should be approximately half the coherence length of the light source so that with each successive reflection a delay is introduced approximating a full coherence length. A beam of light 62 entering the cavity has a portion passed as beam 63 and a portion 64 reflected. The portion 64 is reflected by mirror 60 back through the cavity to mirror 61 and a portion of this beam appears as beam 65 while another portion is reflected as beam 66. By multiple reflections it is readily apparent that a plurality of beams may be provided by such an apparatus. Each of these beams is optically delayed with respect to the others, the delay depending on the distance between mirrors 60 and 61. This technique for generating multiple reference beams is particularly advantageous where the light source has a very short coherence length. Such apparatus provides very small increments of delay between the components.

Figure 4:
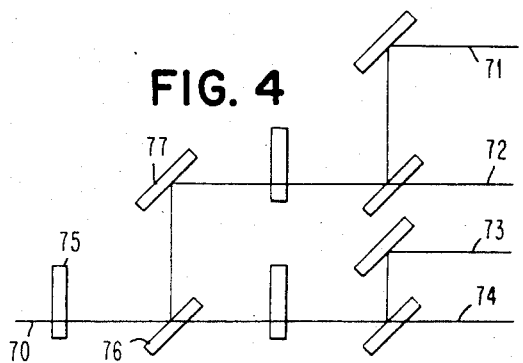

A further apparatus for providing multiple reference beams for entry into optical delay elements is the total internal reflection deflector of FIG. 4. A beam of light 70 is broken down into components 71 – 74 in this two stage deflector. Each stage of the deflector includes a passive rotator 75, a birefringent element 76 and a mirror 77. The second stage which responds two input light components and provides four output components utilizes one rotator for each component and a birefringent element and a mirror for each component. Beams 71 – 74 are directed through optical delay elements such as the elements 54 – 56 or 32 and then the components are recombined in a similar deflector so that they are provided on a common axis.

In the reconstruction of the hologram only a single reference beam is necessary. This reconstruction feature occurs since the construction of the holograms took place utilizing the plural collinear reference beams. In addition less coherence is required in the reconstruction process from that which is required in the formation process. To reconstruct an image of the entire stored object from a developed photographic emulsion, the developed emulsion is illuminated with a single beam of radiation which may have a short coherence length. Filtered white light having a small coherence length may be utilized in the readout of the hologram.

Although the formation of the interference patterns of photographic emulsion 11 has been described as taking place according to conventional holography, it is understood that Lippmann holography may also be utilized. In such an instance reference beam 13 would interfere with scattered light beam 12 from opposite sides of emulsion 11. The same apparatus may be utilized to accomplish this type of recording merely by adding suitable optical beam directing elements. In addition, it is to be realized that the method and apparatus described are not limited to the storage and readout of three dimensional objects only. Other forms of information in pictorial, graphic or other form may also be stored and read out using this invention.

While the invention has been particularly shown and described with reference to the preferred embodiments thereof, it will be understood by those skilled in the art that the foregoing and other changes in form and details may be made therein without departing from the spirit and scope of the invention.

What is claimed is:

1. A method of recording information as interference patterns in a storage medium, comprising
    interfering in the medium an information bearing beam of radiation from an object whose dimensions are greater than the coherence length of the radiation with more than two collinear and coextensive reference beams of radiation coherent with the information bearing beam, to form the patterns, each of the reference beams traversing differing optical path lengths so as to be relatively delayed with respect to one another to interfere in time sequence with different portions of the same information bearing beam.

2. The method of claim 1, wherein the path length difference between each two successive reference beams is not greater than the coherence length of the radiation.

3. The method of claim 1, wherein the information bearing beam of radiation and the plurality of reference beams of radiation interfere from the same side of the recording medium to form holograms as the patterns.

4. The method of claim 1, wherein the information bearing beam of radiation and the plurality of reference beams of radiation interfere from opposite sides of the recording medium to form Lippmann holograms as the patterns.

5. A method of recording information as holograms in a storage medium, comprising
    interfering in the medium scattered radiation from an object whose dimensions are greater than the coherence length of the radiation with more than two collinear and coextensive reference beams of radiation coherent with the information bearing beam to form the holograms, each of the reference beams traversing differing optical path lengths so as to be relatively delayed with respect to one another to interfere in time sequence with different portions of the same scattered radiation.

6. The method of claim 5, wherein the path length difference between each two successive reference beams is not greater than the coherence length of the radiation, such that a hologra... is formed by the interference of a reference beam and a portion of the scattered radiation, the interfering portion being scattered from a part of the object having dimensions substantially equal to the coherence length of the radiation.

7. A method of storing and reading out information stored as holograms in a storage medium, comprising
    directing a beam of coherent light at an object having dimensions greater than the coherence length of the light to form scattered radiation carrying information indicative of the dimensions of the object,
    forming more than two coextensive reference beams of coherent light collinear with respect to one another and having an optical path length difference between each two successive beams which does not exceed the coherence length of the light,
    effecting the time sequenced interference in the medium of each reference beam with a different portion of the same scattered light to form the holograms, each portion of the scattered light carrying information representing a part of the object having dimensions not exceeding the coherence length of the light, and
    directing a beam of light at the medium after processing it along an axis collinear with the axis of the reference beams to form an image of the entire object.

8. Apparatus for storing information in the form of interference patterns in a storage medium, comprising
    a source of coherent radiation,
    means for directing a portion of the source radiation from said source at an object having dimensions greater than the coherence length of the radiation to provide scattered radiation carrying information indicative of the object at said medium,
    means for forming a plurality of collinear reference beams of coherent radiation from another portion of the source radiation for interference in time sequence at said medium with the scattered radiation to form the interference patterns,
    each successive two of said reference beams having a path length difference not greater than the coherence length of the source radiation.

9. The apparatus of claim 8, wherein the forming means comprises means for accepting the other portion of the source radiation to form the plurality of reference beams and imparting differing predetermined delays to the beams, and
    means for collineating the delayed reference beams for interference with different portions of the scattered radiation from a common axis at the medium.

10. The apparatus of claim 9, wherein the means for accepting the other portion of source radiation and imparting differing delays comprises a Fabry-Perot cavity.

11. Apparatus for forming a hologram of an object comprising a source of a coherent light beam having an effective coherence length which is less than a dimension of said object;

means for dividing said beam into a first section and a second section;

means for projecting the first section of the beam onto said object;

means for dividing the second section of the beam into a pair of components;

means for recombining the pair of components of the second beam in a collinear relationship after they have passed through different path lengths;

a photographic medium positioned to receive illumination reflected from said object; and means for projecting the second recombined section onto the photographic medium, whereby the first and second sections coherently interfere with each other at the photographic medium over a depth of field corresponding to points on the object separated by a distance greater than said coherence length.

12. The apparatus of claim 11 wherein the means for projecting the recombined second section of the beam onto the photographic medium comprises a lens.

13. The method of forming a hologram of an object having a dimension which is greater than the effective coherence length of the light source, the method comprising simultaneously exposing a photographic plate to an object beam reflected from an object illuminated by a coherent light source and a reference beam from said coherent light source, said reference beam having a plurality of components each of which has traveled through a different path length from the coherent light source to the photographic plate and which are collinear with each other and have the same radius of curvature at the photographic plate, the components of the reference beam being passed through a lens which projects them on the photographic plate, whereby said beams coherently interfere with each other at the plate over a depth of field corresponding to points on the object separated by a distance greater than said coherence length, and developing the resultant photographic plate.

14. The method of forming a hologram of an object having a dimension which is greater than the effective coherence length of the light source, the method comprising simultaneously exposing a photographic plate to an object beam reflected from an object illuminated by a coherent light source and a reference beam from said coherent light source, said reference beam having two components each of which has traveled through a different path length from the coherent light source to the photographic plate and which are collinear with each other and have the same radius of curvature at the photographic plate, the difference between the path lengths being approximately the coherence length of the coherent light source, whereby said beams coherently interfere with each other at the plate over a depth of field corresponding to points on the object separated by a distance approximating said coherence length, and developing the resultant photographic plate.

* * * * *